United States Patent
Cooper

(10) Patent No.: US 10,834,486 B2
(45) Date of Patent: Nov. 10, 2020

(54) MANAGEMENT OF TELECOMMUNICATIONS CONNECTIONS

(75) Inventor: Ian Robert Cooper, Kesgrave (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 451 days.

(21) Appl. No.: 13/144,904

(22) PCT Filed: Jan. 7, 2010

(86) PCT No.: PCT/GB2010/000016
§ 371 (c)(1),
(2), (4) Date: Jul. 15, 2011

(87) PCT Pub. No.: WO2010/082016
PCT Pub. Date: Jul. 22, 2010

(65) Prior Publication Data
US 2011/0274009 A1    Nov. 10, 2011

(30) Foreign Application Priority Data
Jan. 15, 2009  (EP) ................................. 09250095

(51) Int. Cl.
*H04Q 11/04* (2006.01)
*H04L 12/24* (2006.01)
(Continued)

(52) U.S. Cl.
CPC ......... *H04Q 11/04* (2013.01); *H04L 12/2869* (2013.01); *H04L 41/0806* (2013.01);
(Continued)

(58) Field of Classification Search
CPC .......... H04L 12/16; H04L 12/28; H04L 12/66
(Continued)

(56) References Cited

U.S. PATENT DOCUMENTS 5,134,685 A  *  7/1992  Rosenbluth ..................... 706/25
5,889,470 A       3/1999  Kaycee et al.
(Continued)

FOREIGN PATENT DOCUMENTS

EP       1079658       2/2001
EP       1748671       1/2007
(Continued)

OTHER PUBLICATIONS

International Search Report for International Application No. PCT/GB2010/000504 dated May 11, 2010.
(Continued)

*Primary Examiner* — Lakeram Jangbahadur
(74) *Attorney, Agent, or Firm* — Patterson Thuente Pedersen, P.A.

(57) ABSTRACT

A network distribution, point (1) for operation as a node in a telecommunications system intermediate between a remote access server (41) and a plurality of individual termination points (1) served from the remote access server (41) by respective digital subscriber loops (30), in particular at an optical fibre/copper wire interface (17), incorporates a dynamic line management system (18) for processing data relating to the capabilities of each of the digital subscriber loops (30), and generating a pro file of each digital subscriber loop (30) for transmission to the remote access server (49) to allow control of the transmission of data to the individual termination points.

12 Claims, 5 Drawing Sheets

(51) Int. Cl.
*H04M 3/30* (2006.01)
*H04L 12/28* (2006.01)

(52) U.S. Cl.
CPC .......... *H04L 41/0853* (2013.01); *H04L 41/12* (2013.01); *H04L 41/16* (2013.01); *H04M 3/306* (2013.01); *H04Q 2213/13039* (2013.01); *H04Q 2213/13092* (2013.01); *H04Q 2213/13109* (2013.01); *H04Q 2213/13349* (2013.01)

(58) Field of Classification Search
USPC ........................................................ 370/255
See application file for complete search history.

(56) References Cited

U.S. PATENT DOCUMENTS

| | | | |
|---|---|---|---|
| 6,374,288 B1 | 4/2002 | Bhagavath et al. | |
| 6,473,851 B1* | 10/2002 | Plutowski | 713/1 |
| 6,546,089 B1 | 4/2003 | Chea et al. | |
| 6,580,727 B1 | 6/2003 | Yim et al. | |
| 6,782,884 B1 | 8/2004 | Chen et al. | |
| 6,879,639 B1 | 4/2005 | Verbin et al. | |
| 6,963,538 B1 | 11/2005 | Giroux et al. | |
| 6,975,597 B1* | 12/2005 | Baker et al. | 370/255 |
| 7,013,244 B2* | 3/2006 | Cherkassky | G10L 21/0208 702/189 |
| 7,047,304 B2* | 5/2006 | Senapati et al. | 709/229 |
| 7,058,122 B2* | 6/2006 | Brown | H04M 3/306 375/219 |
| 7,076,556 B1 | 7/2006 | Brock et al. | |
| 7,130,870 B1 | 10/2006 | Pecina et al. | |
| 7,489,693 B2* | 2/2009 | Xu | 370/395.5 |
| 7,660,601 B2 | 2/2010 | Janik et al. | |
| 7,684,325 B2 | 3/2010 | Defoort et al. | |
| 7,752,151 B2* | 7/2010 | Nugent | 706/15 |
| 7,860,029 B2* | 12/2010 | Sekine et al. | 370/255 |
| 7,930,399 B2* | 4/2011 | Brown et al. | 709/226 |
| 7,979,370 B1* | 7/2011 | Ershov | 706/20 |
| 7,986,686 B2* | 7/2011 | Nadeau et al. | 370/386 |
| 8,005,018 B2* | 8/2011 | Magnone et al. | 370/255 |
| 8,027,270 B1 | 9/2011 | Campana et al. | |
| 8,031,619 B2* | 10/2011 | Tzannes et al. | 370/241 |
| 8,068,584 B2 | 11/2011 | Wu et al. | |
| 8,116,218 B2* | 2/2012 | Lv et al. | 370/252 |
| 8,144,580 B2 | 3/2012 | Pickering et al. | |
| 8,300,528 B2 | 10/2012 | Everett et al. | |
| 8,406,135 B2 | 3/2013 | Pickering et al. | |
| 8,537,701 B2 | 9/2013 | Croot et al. | |
| 2002/0085626 A1 | 7/2002 | Starr | |
| 2002/0136203 A1 | 9/2002 | Liva et al. | |
| 2002/0141443 A1 | 10/2002 | Christensen et al. | |
| 2003/0182666 A1 | 9/2003 | You | |
| 2003/0236760 A1* | 12/2003 | Nugent | G06N 3/063 706/26 |
| 2004/0120390 A1 | 6/2004 | Brown et al. | |
| 2004/0146072 A1 | 7/2004 | Farmwald | |
| 2005/0021716 A1 | 1/2005 | Adamczyk et al. | |
| 2005/0021739 A1 | 1/2005 | Carter et al. | |
| 2005/0047535 A1 | 3/2005 | Ahmed et al. | |
| 2005/0123028 A1 | 6/2005 | Cioffi et al. | |
| 2005/0174938 A1 | 8/2005 | Richardson et al. | |
| 2005/0237940 A1 | 10/2005 | Tennyson | |
| 2006/0072722 A1 | 4/2006 | Savoor et al. | |
| 2006/0114818 A1 | 6/2006 | Canali et al. | |
| 2006/0121854 A1 | 6/2006 | Abhishek et al. | |
| 2006/0198430 A1* | 9/2006 | Rhee et al. | 375/222 |
| 2006/0224532 A1* | 10/2006 | Duan | G06K 9/623 706/15 |
| 2008/0095188 A1 | 4/2008 | Remy et al. | |
| 2009/0103559 A1* | 4/2009 | Pickering | H04L 12/2856 370/463 |
| 2009/0262647 A1* | 10/2009 | Pickering | H04L 12/2856 370/241 |
| 2010/0195666 A1 | 8/2010 | Adamczyk et al. | |
| 2010/0290362 A1 | 11/2010 | Croot et al. | |
| 2010/0293274 A1* | 11/2010 | Everett | H04L 12/2876 709/224 |
| 2011/0191472 A1* | 8/2011 | Croot et al. | 709/224 |
| 2011/0274009 A1 | 11/2011 | Cooper | |
| 2011/0274101 A1 | 11/2011 | Cooper | |
| 2012/0026873 A1 | 2/2012 | Spinar et al. | |
| 2012/0099424 A1* | 4/2012 | Croot et al. | 370/225 |

FOREIGN PATENT DOCUMENTS

| | | |
|---|---|---|
| EP | 1953959 | 8/2008 |
| EP | 1995942 | 11/2008 |
| EP | 2073446 | 6/2009 |
| EP | 2209324 | 7/2010 |
| EP | 2209325 | 7/2010 |
| WO | WO0212497 | 2/2002 |
| WO | WO0235793 | 5/2002 |
| WO | WO03/009541 | 1/2003 |
| WO | WO2004091144 | 10/2004 |
| WO | WO2005057315 | 6/2005 |
| WO | WO2006103557 | 10/2006 |
| WO | WO2007/012867 | 2/2007 |
| WO | WO2007/012869 | 2/2007 |
| WO | WO2009/081131 | 7/2009 |

OTHER PUBLICATIONS

International Search Report for International Application No. PCT/GB2009/002329 dated Dec. 23, 2009.
International Search Report for International Application No. PCT/GB2010/000016 dated May 6, 2010.
International Search Report for International Application No. PCT/GB2010/000013 dated May 6, 2010.
Kee Bong Song et al., "Dynamic Spectrum Management for Next-Generation DSL Systems", IEEE Communication Magazine, IEEE Serice Center. vol. 40 No. 10, Oct. 1, 2002. p. 102.
Vanbleu, Advanced Equalization Techniques for DMT-Based Systems. Oct. 2004.
Anonymous: ADSL2 and ADSL2+—The New ADSL Standards. White Paper. Oct. 2006.
Anonymous: Asymmetric Digital Subscriber Line (ADSL) transceivers—Extended bandwidth ADSL2 May 2003.
"Dynamic Line Management for Digital Subscriber Lines" Alcatel Technology White Paper. © 2005.
TR-130 xDSL EMS to NMS Interface Functional Requirements. Feb. 2007.
Application and File History for U.S. Appl. No. 13/144,902, filed Jul. 15, 2011, inventor Cooper.
Application and File History for U.S. Appl. No. 13/121,905, filed Mar. 30, 2011, inventors Croot et al.
Application and File History for U.S. Appl. No. 13/260,114, filed Dec. 22, 2011 inventors Croot et al.
European Search Report for European Application No. 06251521.8 filed Sep. 6, 2006.
Written Opinion of the International Searching Authority for International Application No. PCT/GB2006/002818 filed Sep. 25, 2006.
International Search Report for International Application No. PCT/GB2006/002818 dated Sep. 25, 2006.
Anschutz, "DSL Evolution-Architecture Requirements for the Support of QoS-Enabled IP Service", Technical Report DSL Forum TR-509, Sep. 1, 2003, pp. 1-48.
International Search Report and Written Opinion for International Application No. PCT/GB2006/002826 dated Sep. 26, 2006.
European Search Report for European Application No. 05254769 dated Jan. 23, 2006.
European Search Report for European Application No. 08253177.3 dated Mar. 23, 2009.
European Office Action for European Application No. 10711070.2 dated Feb. 28, 2013.
European Result of consultation for European Application No. 10711070.2 dated Jul. 25, 2013.

(56) References Cited

OTHER PUBLICATIONS

Comments on International Search Report and Written Opinion of the International Searching Authority for European Application No. 10711070.2 dated Sep. 7, 2011.
Chinese First Notification of Office Action and Search Report for Chinese Application No. 201080014466.7 dated Nov. 4, 2013.
Reply to Written Opinion in European Patent App. No. 09785179.4 dated Apr. 18, 2011.
International Search Report for International Application No. PCT/GB2008/004213 dated May 13, 2009.
European Search Report for European Application No. EP07255001.5 dated Jul. 1, 2008.
Silverman et al., "G. gen" G.vsdl: G. ploam, "New Reporting and Control to Improve the Carriers Ability to Optimie VDSL2"—ITU Telecommunication Standardization Section. Temporary Document SD-075, ASSIA Inc. San Diego. CA Jan. 15-19, 2007. (8 pages).
Verlinden et al., "Dynamic Spectrum Management for Digital Subscriber Lines", Edition 2, White Paper. Alcatel 2005. (12 pages).
Bostoen et al., "Optimizing DSL for multimedia services", Alcatel Telecommunications Review. Jun. 2005. pp. 155-159.
Application and File History for U.S. Appl. No. 11/989,136, filed Jan. 22, 2008, inventors Pickering et al.
Application and File History for U.S. Appl. No. 11/989,408, filed Jan. 25, 2008, inventors Pickering et al.
Application and File History for U.S. Appl. No. 12/809,798, filed Jun. 21, 2010, inventors Croot et al.

\* cited by examiner

MANAGEMENT OF TELECOMMUNICATIONS CONNECTIONS

RELATED APPLICATIONS

The present application is a National Phase entry of PCT Application No. PCT/GB2010/000016, filed Jan. 7, 2010, which claims priority from European Patent Application No. 09250095.8, filed Jan. 15, 2009, the disclosures of which are hereby incorporated by reference herein in their entirety.

TECHNICAL FIELD

This invention relates to telecommunications systems and in particular to the management of network equipment interfacing between a network and individual customer premises systems. Such equipment is widely dispersed geographically, and has to operate without direct human supervision and in a wide variety of environments and circumstances.

BACKGROUND ART

As shown in FIG. 1, in conventional Digital Subscriber Loop (DSL) services, provided from the exchange 39 (or cabinet), each customer premises 2 has a dedicated physical connection 30 to the DSL access multiplexer (DSLAM) 31 in the exchange 39. The connections from the exchange 39 to several different customer premises 2 may pass through a single distribution point 1, but each connection is a complete end-to-end connection.

A management system 18 can be provided to optimize the service for each customer by maximizing the data rate over the physical layer 30 (subject to a predetermined maximum) while maintaining the stability of the line. This is achieved for each line using a Dynamic Line Management (DLM) system and a Rate Adaptive Management Box (RAMBo) 41 which automatically selects the optimum rate profile for each line. The chosen profile rate (upstream and downstream) supported by the line is also applied to the BRAS (Broadband Remote Access Server) 42 serving the user connection 32 so that the services provided over the DSL line 30 match the physical capabilities of the line. The BRAS is not located at the exchange but is located deeper in the network. It can handle many thousands of lines and would provide the broadband services for many exchanges).

The physical layer connectivity is provided by a Digital subscriber line access multiplexer (DSLAM) capped at a predetermined rate limit, e.g. 5 Mbit/s, and the BRAS provides the services to the DSLAM so that the services are capped to the same rate limit so that there is rate matching between the physical line and the services that are applied over that line.

In order to perform this function it is necessary to gather a wide selection of performance statistics from each line at regular intervals (e.g. every fifteen minutes), store these in a data-warehouse and perform subsequent post-processing of this data in order to choose the correct rate profile for each line. Also, the previous history of the line has to be accounted for in order to provide some hysteresis, i.e. to prevent the line profile (rates) being changed by too much, or too frequently, both of which can result in difficulties in maintaining services such as streaming. Typical statistics gathered may include bit-rates, margins, errored seconds, severely errored seconds, and mean time between errors. These statistics are stored by a data collector and fed into the Digital line management system 18, which is responsible for selecting an appropriate DSL profile for each line.

However, as shown in FIG. 2, this can become difficult to achieve when fiber-to-the-distribution-point (FttDP) nodes are considered. In such systems the connections 32 between the optical line terminal (OLT) 33 in the exchange and the individual distribution points 1 are provided by optical fiber, each carrying the traffic for all the final drop connections 30 served by that distribution point. This allows the distribution point to serve a large number of customer premises. Instead of a single DSLAM 31 providing the line statistics for thousands of lines at one convenient location, there could be a large number of remote nodes located at the distribution points 1, each provisioning between 8 and 24 lines.

Because of the transition between optical fiber and electrical "copper" connections at the distribution points, they have more capabilities than a typical copper-to-copper distribution point. Essentially the modem conventionally located in the DSLAM 31 at the exchange 39 is instead located in a mini-DSLAM 34 at the DP 1 (only shown for one DP in FIG. 2). Thus the DSLAM 31 and BRAS 42 functions are no longer co-located.

As well as having some active electronics at the DP, some intelligence can be added. This allows the line characteristics to be measured at the distribution point 1, and such an arrangement is described in International Patent Specification 2007/012867. The DSL modem 34 located at the distribution point has the ability to draw statistics both from itself and the equivalent modem 2 on the other end of the local loop located at the customer premises (i.e. it gathers both upstream and downstream line performance statistics).

However, in this arrangement each distribution point has to transmit the periodically-gathered statistics back to the remote data collector 43 associated with the central management function 18, so that its associated RAMBo (41) can set the rate for each line. This rate then needs to be communicated to both ends of the connection 30 between the distribution point 1 and customer terminal 30. The dotted lines in FIG. 2 illustrate these information flows. This central data collection system adds to the operations, administration, and maintenance overhead that the network has to carry and requires a data warehouse and large central processing capabilities. Moreover, all of this statistical data has to be transmitted in-band with user data, thus adding considerably to the overhead burden of the transmission system. Such a system would require a very complex line management system, and such an arrangement would be very inefficient. An additional consideration is that the optical fiber connection 32 is unsuitable for delivering an electrical power supply from the exchange side 31, so power to operate the distribution point, including the optical/electrical transducers, has to be sourced from elsewhere.

SUMMARY OF THE INVENTION

According to an embodiment of the invention, there is provided a network distribution point for operation as a node in a telecommunications system intermediate between a remote access server and a plurality of individual termination points served from the remote access server by respective digital subscriber loops, the network distribution point incorporating a dynamic line management system for processing data relating to the capabilities of each of the digital subscriber loops, and generating a profile of each digital subscriber loop and used for setting a rate profile for transmission to the remote access server to allow control of the transmission of data to the individual termination points.

Embodiments of the present invention take advantage of the data processing power available at the mini-DSLAM in each distribution point, and the availability at the DP of the data to perform dynamic line management (DLM), to make the DP autonomous in setting its own maximum stable DSL rate, by processing the data relating to line capabilities locally at the distribution points, and implementing any subsequent change of DLM profile locally. This approach still allows decisions on DLM profile choice to be made taking into account demands on neighboring customer terminals sharing the same DP 1. This configuration allows some of the DSLAM functions to be performed by the individual remote nodes, allowing each remote node to implement a local autonomous system using the physical layer statistics it collects, and to process them locally to provide an optimum DSL profile for each line while retaining system stability. In particular, the RAMBo functions 41 are migrated to the distribution points 1.

The operational environment of each line served by the Distribution Point 1 will be very similar, so there are advantages in implementing an autonomous DLM system at the DP. This would allow each DSL line operating from a remote node located at the DP to be optimized, based upon the local operational environment as seen at that DP.

In a fiber-to-the-distribution-point system it is impractical to power the distribution points from the exchange side because of the absence of a wired connection. The remote nodes therefore take power from the customer end of the connection. It is therefore important that power consumption is minimized.

In one embodiment of the invention, the local processing of physical layer DSL line data is achieved using an Artificial Neural Network (ANN). The Multilayer Perceptron (MLP) is the most frequently used Artificial Neural Network, due to its ability to model non-linear systems and establish non-linear decision boundaries in classification or prediction problems. Furthermore, the MLP is a universal function approximator, which makes it a powerful tool in several signal processing fields: pattern recognition, system modelling, control, etc.

The MLP is suitable for the field of digital line management as this application can be considered as a combination of pattern recognition (recognizing specific patterns of input line statistics) and control system (changing the DLM profile accordingly). Initially it is necessary to 'train' the MLP in order to optimize the physical layer performance of the line from the gathered statistics. The computational burden of implementing an MLP lies in this initial training of the system, that is, in calculating the 'weights' of the nodes and links. However, once trained, the MLP requires very little computational power in order to identify the target profile for a loop, given a set of physical layer statistics. This therefore results in low processing and power overheads, which is particularly desirable if power is to be taken from the customer side.

Existing DLM systems using a Rate Adaptive Management Box (RAMBO) treat all lines individually, without considering local similarities between lines that share the same cable bundle etc. However, at the Distribution Point the operational environment of each line will be very similar, so there are advantages in implementing an autonomous DLM system at the DP. This would allow each DSL line operating from a remote node located at the DP to be optimized, based upon the local operational environment as seen at that DP.

One advantage of using neural nets for such a system is that all of the processor intensive work can be performed during the training of the neural net. Once trained, the neural net is instantiated in the remote node and each analysis of the input data is a simple single iteration through the neural net, which will be just a few multiplications and additions. Therefore the computational load on the remote node processor resources will be minimal. More processing power would be required if a training algorithm is implemented to allow local adaptation at the remote node, but this training could be performed when there was plenty of spare computational resource available. As these remote nodes are powered from the CPE and that computational power (and electrical power in general) is therefore not a resource to be squandered.

It would be possible to train a single MLP and then provide an instance of this MLP in all the remote nodes located at the Distribution Points. This would form the basis of the local DLM system in each remote node. As time progresses each MLP can be allowed to slowly mutate into a neural network optimized for the particular statistics generated by the local loops attached to that particular node.

An embodiment will now be described with reference to FIGS. 3 and 4 of the drawings.

DETAILED DESCRIPTION

Figure 3:
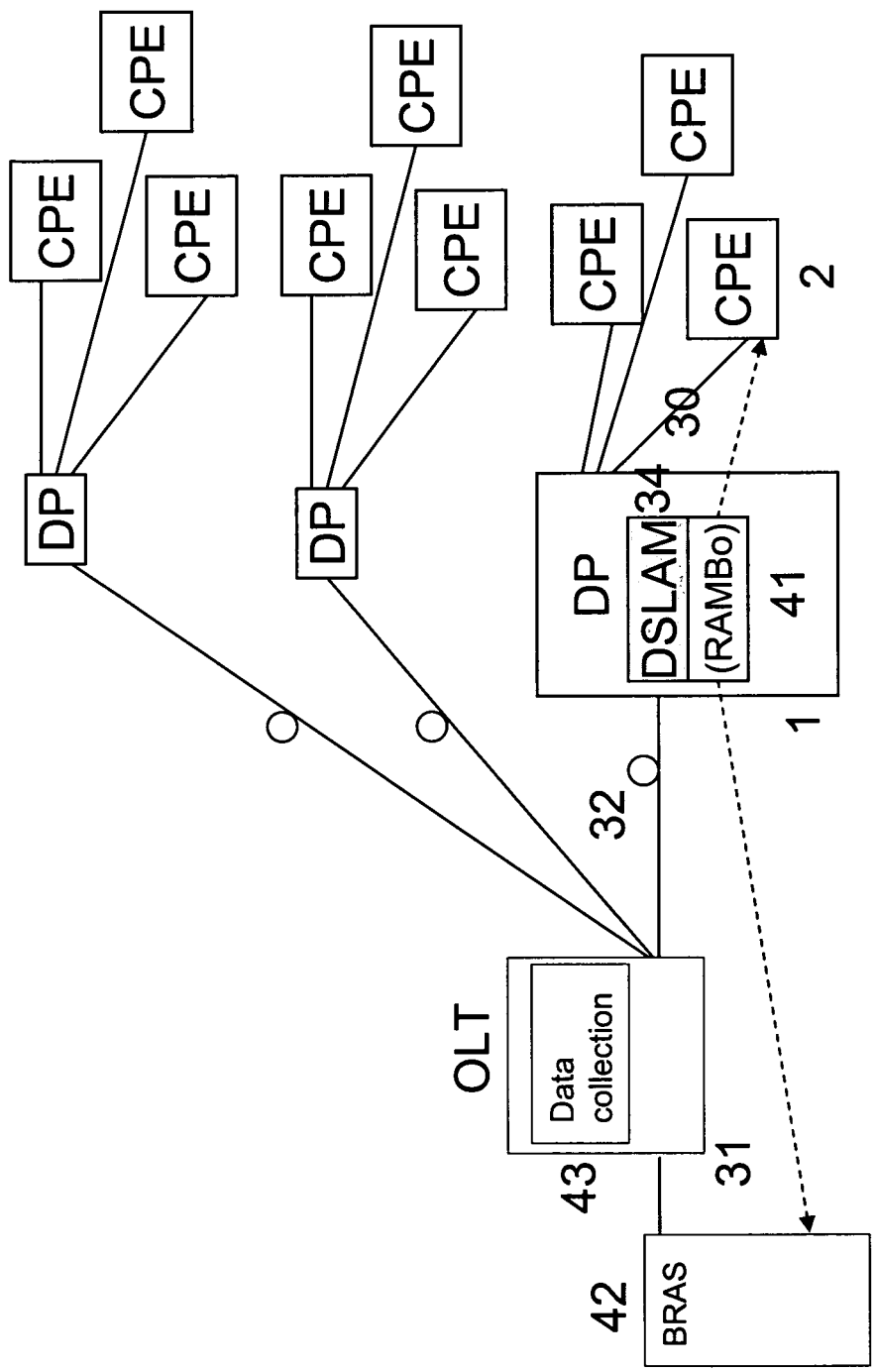
FIG. 3 depicts a fiber-to-the-data-point system modified according to the invention.
Figure 4:
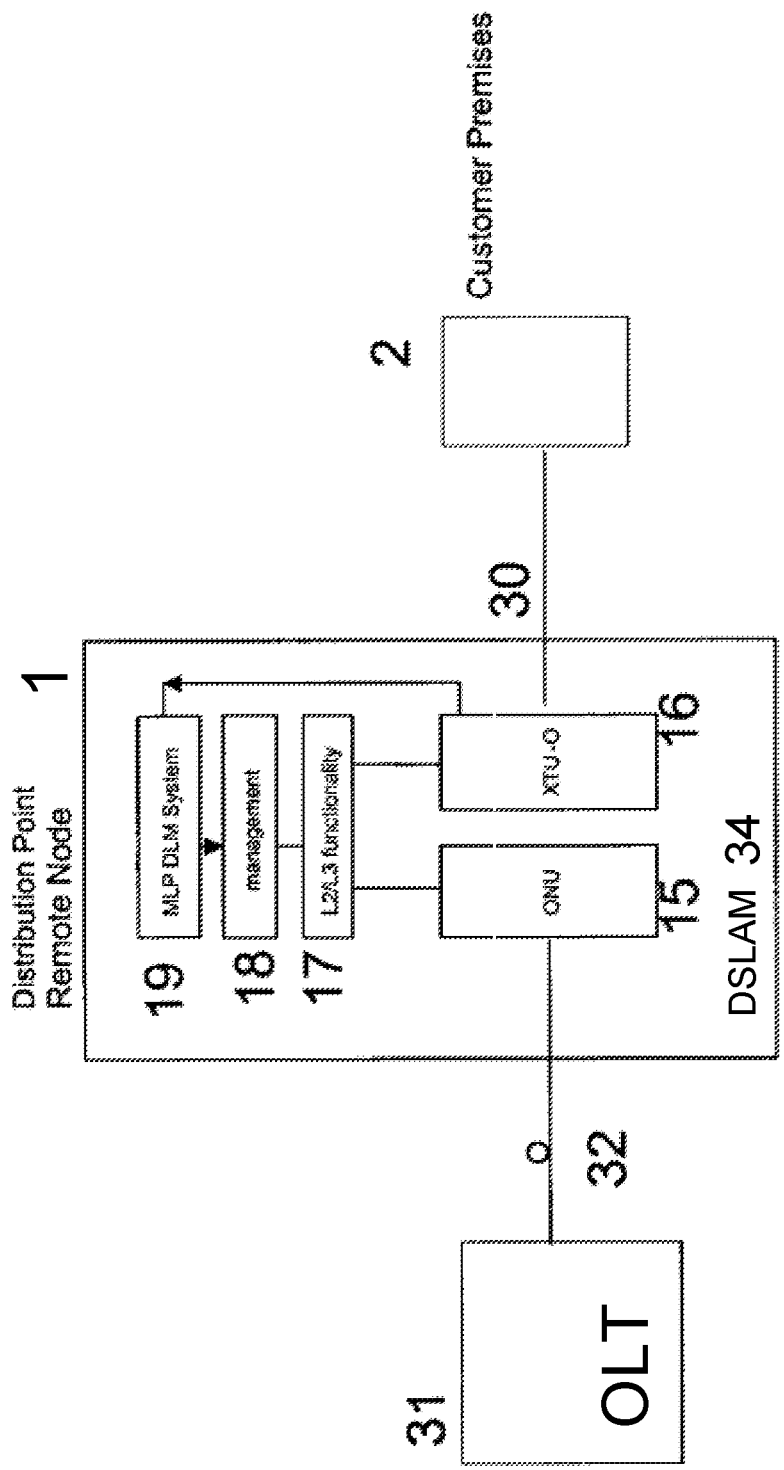
FIG. 4 shows how the neural net digital line management system of the invention is incorporated into the network node functions.
Figure 5:
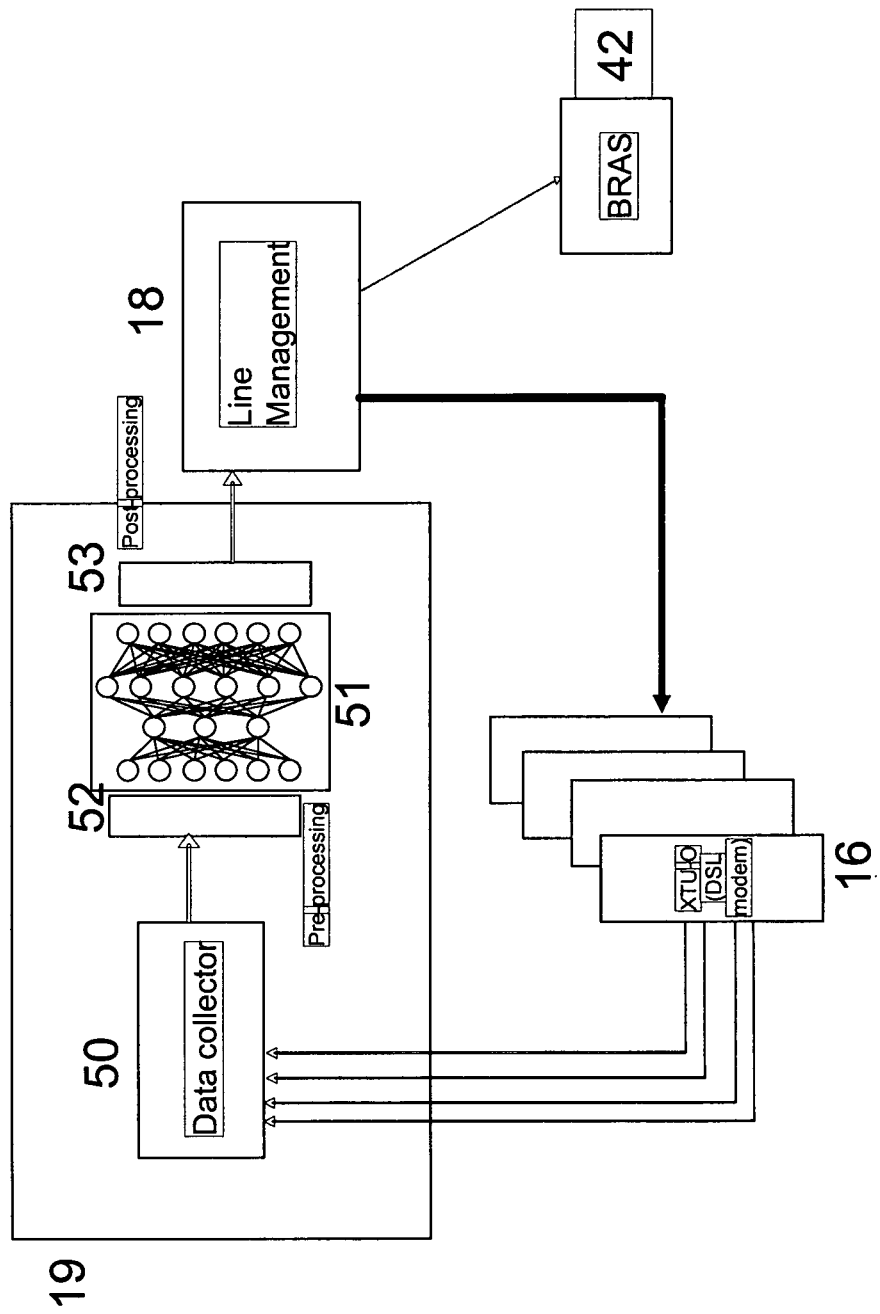
FIG. 5 shows the neural net digital line management system in more detail.

It should be understood that FIGS. 3 to 5 illustrate the functional elements of the system, which may in practice be embodied in one or more electronic components or in software.

Figure 1:
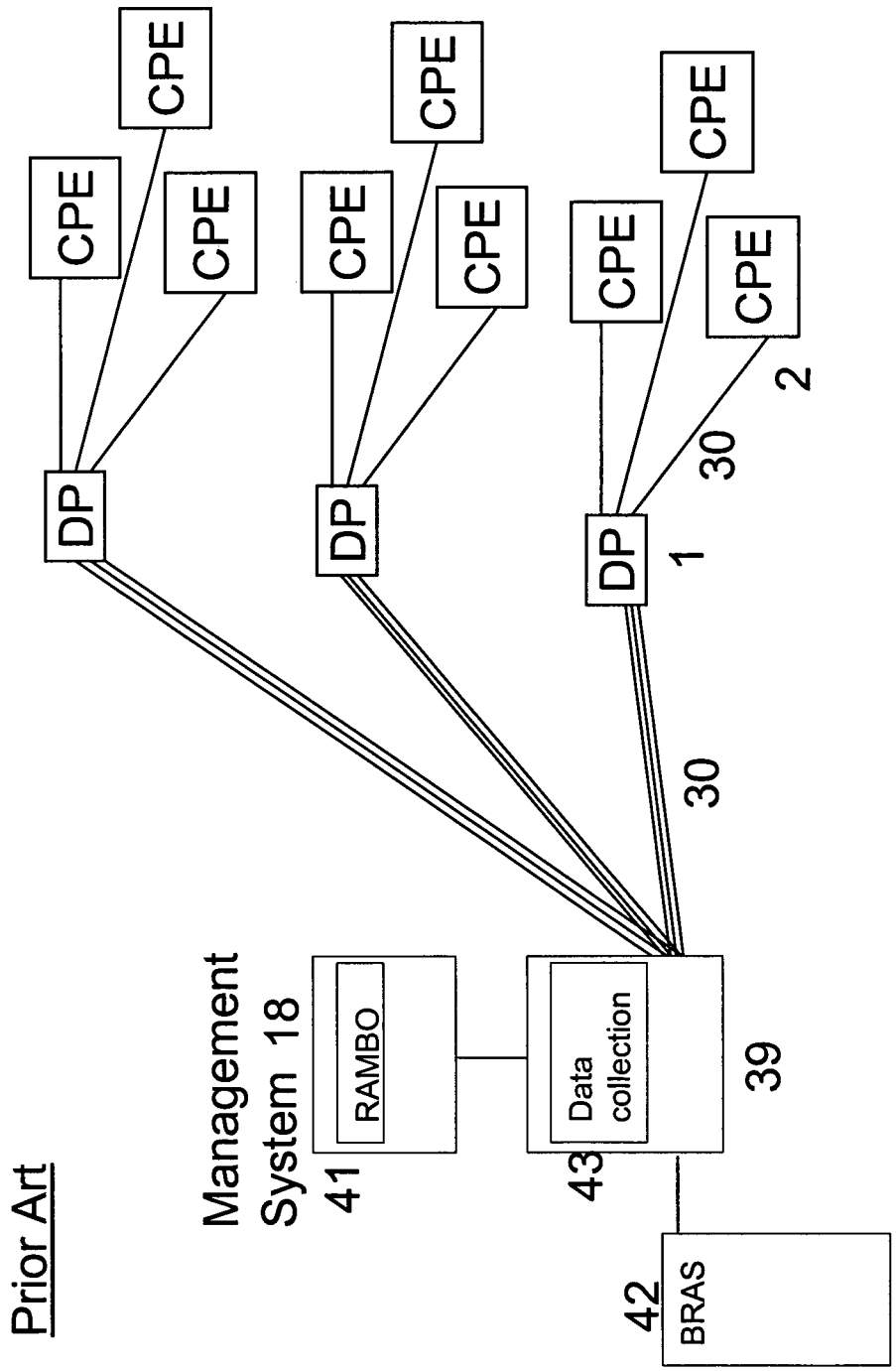
FIG. 1 depicts a conventional digital subscriber loop system, already discussed.
Figure 2:
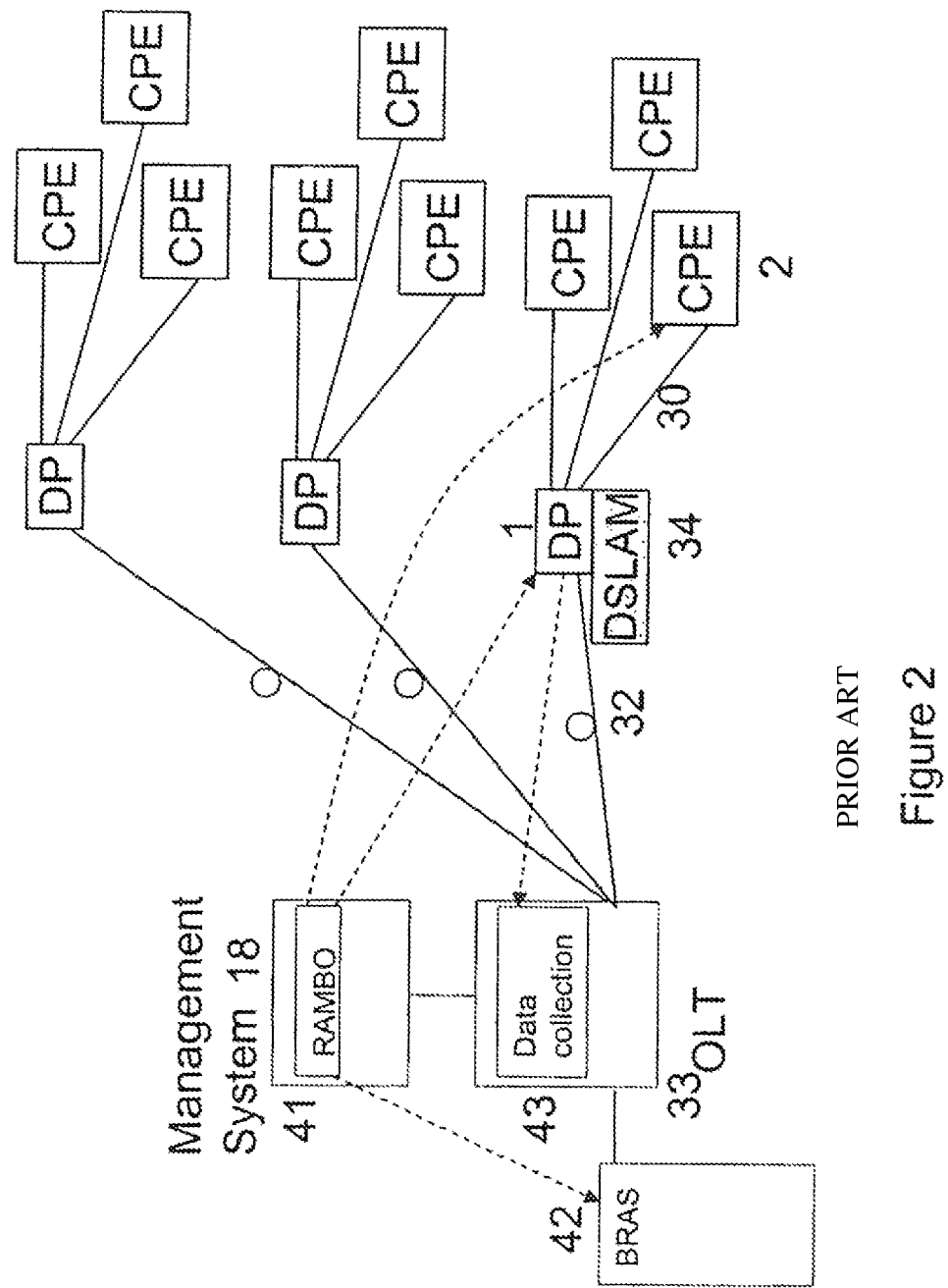
FIG. 2 depicts a fiber-to-the-data-point system, already discussed.

FIG. 3 illustrates the configuration of the system, and by comparison with FIG. 2 the modifications made according to the invention can be understood. The principal difference is that the Rate Adaptive Management Box (RAMBo) 41 has been migrated from the management system 18 associated with the optical line termination 33 in the exchange to the distribution point 1. (It will be understood that each distribution point can be similarly equipped). The data collection and processing functions controlling the data rate to be used over the DSL link 30 can therefore be performed at one end of that link. Thus, instead of measurement data sent from the DP 1 to the RAMBo 41 in an exchange-based management system 18, and the resulting data rate required returned to the DP 1, the RAMBo 41 located in the DP 1 determines the data rate for itself, and only needs to communicate the required data rate to the BRAS 42 and the individual customer terminals 2, as shown by the dotted lines in FIG. 3.

FIG. 4 depicts a node 1 (distribution point) having a wired connection 30 to customer premises equipment 2 and an optical connection 32 to an optical line terminal (OLT) 31. Each wired customer connection is connected to an xDSL Transmission Unit (Optical) (XTU-O) 16, and the optical connection 32 is connected through an optical network unit (ONU) 15. These are interlinked by a interface unit 17 for handling functionality at levels 2 and 3 of the standard OSI seven-level model, under the control of a dynamic line management system 18. This function includes the multiplexing/demultiplexing of the various customer lines over the optical connection 32.

Having a local Dynamic line management system 18 in each node reduces the requirement for processing power, memory storage requirements, and communications back to a central DLM controller.

In embodiments of the present invention the dynamic line management system is operated under the control of a Multilayer Perceptron 19.

FIG. 5 shows the basic components of the Multi-layer perceptron block 19. They comprise a data collector 50 and a neural net subsystem 51, and operate in conjunction with the dynamic line management system 18 itself.

The data collector 50 gathers line data from each local modem 16. A pre-processing unit 52 prepares the data for input to the neural network 51, by changing the format of the data into a form that can be 'read' by the MLP. Such pre-processing may take, say, a running average of several measurements in order to prevent too sudden a change in input parameters into the MLP which could result in wildly fluctuation DLM profile choice. The neural network 51 assesses the data and identifies the prevailing DSL performance data, to generate an output which is then passed to a post-processor 53 for presenting the data in a form suitable for use by the DLM processor 18, which generates a profile for use by the DSL modem 16.

The profile selected by the DLM processor 18 impacts the rate at which the DSL system 16 can transmit/receive, so the profile information is also transmitted to the Broadband Remote Access Server (BRAS) 42 in the DSLAM OLT 31. This allows the BRAS to moderate the rate at which it transmits data, to avoid data being provided from the core IP network faster than it can be transmitted over the DSL link 30, and therefore having to be discarded.

The DLM 18, and neural net that informs it, handles data relating to several lines 30 serving different customer premises equipment 2, so that at times of high contention (the total capacity required by the users exceeding the capabilities of the network equipment), the available capacity can be distributed fairly, for example to ensure that the level of quality of service to each user meets a respective agreed level. These capacity constraints are unlikely to be on the optical connection 32 itself, but in the OLT 31 and ONU 15 between which it is connected.

The inputs to the dynamic line management system 18 may include data on the RF environment, to allow frequencies subject to local interference to be excluded from the transmissions over the wired local connection 30. Such a system is described in the applicant's co-pending International patent application claiming priority from European application 09250100.6, entitled Telecommunications Connections Management.

The invention claimed is:

1. A network distribution point for operation as a node in a telecommunications system, the network distribution point comprising:
    a digital subscriber loop access multiplexer providing a plurality of digital subscriber lines interfacing with a plurality of individual termination points remote from the network distribution point, and providing a multiplexed digital subscriber line connected to a remote access server that is associated with an exchange remote from the distribution point, wherein the digital subscriber loop access multiplexer is arranged intermediate between the individual termination points and the remote access server to provide an interface therebetween; and
    a dynamic line management system for processing data relating to capabilities of each of the digital subscriber loops, and generating a profile of each digital subscriber loop and used for setting a rate profile to allow control of transmission of data to the individual termination points,
    wherein the digital subscriber loop access multiplexer and the dynamic line management system are co-located in the network distribution point.

2. The network distribution point according to claim 1, arranged to transmit the rate profile so generated to the remote access server.

3. The network distribution point according to claim 1, wherein the dynamic line management system comprises an artificial neural network for processing of data relating to a physical layer of a digital subscriber loop.

4. The network distribution point according to claim 3, wherein the artificial neural network is a Multilayer Perceptron.

5. The network distribution point according to claim 1, in which a connection to the remote access server comprises an optical fiber connection and connections to the individual termination points are made by electrical means.

6. A method comprising:
    operating a dynamic line management system co-located with a digital subscriber loop access multiplexer at a common distribution point, the common distribution point being intermediate and providing an interface between a remote access server that is associated with an exchange remote from the distribution point and a plurality of individual network terminations;
    processing data relating to capabilities of each of a plurality of digital subscriber loops by the dynamic line management system associated with the common distribution point; and
    generating a profile of each digital subscriber loop and using the profile for setting a rate profile.

7. The method according to claim 6, wherein the rate profile is transmitted to the remote access server.

8. The method according to claim 6, wherein the dynamic line management system comprises an artificial neural network for processing of data relating to a physical layer of a digital subscriber loop.

9. The method according to claim 8, wherein the artificial neural network is a Multilayer Perceptron.

10. The method according to claim 8, wherein the neural network is trained prior to installation and then instantiated in the distribution point, and wherein each analysis of input data is a simple single iteration through the neural network.

11. The method according to claim 10, wherein after installation each neural network is allowed to mutate to allow optimization for statistics generated by the individual subscriber connections attached to the respective distribution point.

12. The method according to claim 7, in which a connection to the remote access server comprises an optical fiber connection and connections to the individual termination points are made by electrical means.

* * * * *